United States Patent [19]

McCormick

[11] 4,134,833

[45] Jan. 16, 1979

[54] WATER RECYCLE UNIT-GREY WATER CLEARIFIER

[76] Inventor: Dennis J. McCormick, 350 Wilson St., Petaluma, Calif. 94592

[21] Appl. No.: 838,008

[22] Filed: Sep. 29, 1977

[51] Int. Cl.² ............................................. C02B 1/18
[52] U.S. Cl. .................................. 210/121; 210/305; 210/532 S
[58] Field of Search ................ 210/97, 116, 121, 152, 210/196, 167, 170, 304, 305, 311, 532 S

[56] References Cited

U.S. PATENT DOCUMENTS

| | | | |
|---|---|---|---|
| 630,958 | 8/1899 | Wilson | 210/152 |
| 2,586,447 | 2/1952 | Way | 210/305 X |
| 2,858,939 | 11/1958 | Corliss | 210/152 X |
| 3,426,903 | 2/1969 | Olecko | 210/532 S |
| 3,701,426 | 10/1972 | Wetzel | 210/152 |
| 3,957,642 | 5/1976 | Oldham et al. | 210/121 |

Primary Examiner—John Adee
Attorney, Agent, or Firm—Donald C. Feix

[57] ABSTRACT

A water recycle unit for producing clear water output from grey water input comprises an enclosed container which holds a relatively large volume of water within the container while the heavy materials of the grey water, such as sand and dirt, settle to a lower zone and the lighter materials, such as oil and fibers, rise to an upper zone leaving a central zone of clear water between the lower and upper zones. An internal gate within the container removes clear water from the central zone through the outlet in response to the inflow of additional grey water into the unit through the upper inlet. The outlet is located in a side wall above the level of the central zone of clear water, and the gate includes an inlet opening which is located in the central zone. The gate also includes a passageway between the inlet opening and the outlet for conducting only clear water from the central zone to the outlet. Internal, vertical partitions direct flow within the container and also prevent any turbulence produced by the incoming grey water from being mixed with the clear water existing in the central zone adjacent to the gate inlet opening. The water recycle unit also includes a clear water collector and filter box. This box is an enclosed structure which is preferably joined integrally to one side wall of the container. It includes a spillway for collecting the water which flows out of the outlet of the container and for directing that clear water through a filter.

13 Claims, 3 Drawing Figures

WATER RECYCLE UNIT-GREY WATER CLEARIFIER

BACKGROUND OF THE INVENTION

This invention relates generally to a water recycle unit.

It has specific application to a household water recycle unit which can be used for recycling wash water for subsequent reuse as wash water or as plant water or the like.

In many areas of the country water is in short supply and must be conserved.

It is a primary object of the present invention to construct an inexpensive, efficient water recycle unit which permits water to be recycled indefinitely for certain operations, such as washing, so that the overall, total use of water in households, and in certain industries can be substantially reduced.

In one preferred embodiment of the present invention a water recycle unit for producing clear water output from grey water input comprises a container which has sufficient capacity to provide the time required for the grey water input to go through all of the physical changes needed to provide a clear water output.

These physical changes include the settling of heavy materials, such as sand and dirt, to a lower zone and the rising of lighter materials, such as oil and fibers, to an upper zone to leave a central zone of clear water between the lower and upper zones within the container.

The container is an enclosed container having top and bottom walls, side walls and two end walls and is preferably formed with a rectangular configuration. The preferred rectangular configuration provides simplicity of manufacture, particularly when the container is made of a preferred, molded, fiberglass material. The rectangular configuration also permits an increase in volumetric capacity by simply increasing either the length or width or highth, or any combination of these three dimensions, without changing the principle of operation of the water recycle unit.

The recycle unit includes an upper grey water input so that grey water flows into the interior of the container by gravity.

The container also includes an outlet opening or openings which are preferably located in a side wall of the container and which are disposed at a level which is normally above the upper side of the zone of clear water within the container.

A gate within the interior of the container includes a closed passageway for removing clear water from the central zone through the above mentioned outlet and in response to the inflow of additional grey water into the container through the grey water input. This gate has an inlet end for the above mentioned closed passageway. The inlet is located in the central zone of clear water, and the side walls of the enclosed passageway of the gate prevent grease or oil or hair or other materials suspended in said upper zone from getting into the clear water which flows through the inlet opening and through the internal passageway and out through the outlet at the other end of the enclosed passageway of the gate as the incoming grey water forces the clear water from the central zone up through the inlet opening of the gate.

The container also preferably includes one or more vertically extending interior partitions, although these partitions are not essential. Each of the partitions extends the entire vertical distance between the bottom wall and the top wall, and each partition has one end edge attached to one end wall of the container, but the other end edge of the partition is slightly spaced from the other end wall of the container.

If more than one interior partition is used, the adjacent partitions are staggered so that the inflowing grey water must flow down along one side of one partition and around the end of that partition and then back along the other side of the partition in a reverse direction of flow to the direction of flow on the first side of the partition. The flow must then again change direction as it flows around the edge of the second partition and then along the back face of that second partition. This provides a serpentine type of flow within the container which enhances the settling action. The partitions also reduce turbulence within the container which could otherwise be produced by the incoming grey water.

The internal partitions also have the benefit of increasing the structural rigidity to the container. This provides increased beam strength and shear strength for the container so that relatively large volumes of water can be contained within a relatively light weight container structure.

In most uses of the water recycle unit of the present invention it is desirable to provide some filtering of the clear water to provide for effective removal of chemicals, such as, for example, detergents, that might not be removed to a sufficient degree by the clearing action of the container itself.

In a preferred embodiment of the present invention an additional, clear water collecting and filter box is built alongside of and integrally with the container. This box collects the clear water flowing out of the outlet openings of the container, preferably includes a fiberglass filter which the clearified water spills through before subsequent flow through a filter, such as, for example, a charcoal filter, located below the spillway.

The filter is preferably located in a lower part of the collector box so that the filtered water flows upward through the filter. The cleared and filtered water is then either permitted to flow by gravity out of an outlet opening of the collection box, and to a lower storage unit or units, or it is pumped out of the outlet opening to an upper storage unit or units by a pump which is operated by a sensor float to pump only when the cleared, filtered water reaches a certain level with respect to the outlet opening.

The divider wall between the water clearing container and the collector box, in combination with the inclined spillway, serves also to substantially eliminate pressure fluctuations produced by grey water flowing through the inlet from causing any fluctuations on the fluid flowing through the filter.

The entire water recycle unit, including the water clearing container and the collector - filter box is, in a preferred embodiment of the present invention, made by a fiberglass molding process, which requires only two molds.

The rectangular shape of the water recycle unit permits the unit to be readily installed between the bottom of the floor joists and the ground of a house, or to be buried under a concrete slab, or the unit can be easily suspended underneath the floor joists by straps.

The rectangular configuration of the water recycle unit permits the unit to operate as a square pipe, and only four parts are required for the mold to put the square pipe together. All four parts are the exact same length except for the spillway. Because the unit functions as a pipe, the principle of operation is the same if the unit is twice as long or just half as long. The unit works exactly the same way, and an increase in volume can, therefore, be obtained just by increasing either the width or the highth or the length of the unit.

The water recycle unit has all of the piping and tubing built into it in the course of manufacture.

The unit is built as a beam (as noted above), and obtains additional shear and beam strength from the inner walls.

The water recycle unit of the present invention provides a number of important benefits.

It provides for reuse of water. The water can be reused time and time again in the case of a washing machine, and the water can be reused at least once if, for example, recycled wash water is reused for plant watering.

The water recycle unit can, as noted above, be used to store cleared and filtered water in overhead storage, and this overhead storage can itself be used for timed watering of plants or for other uses including recycling the water back into washing machines.

An important benefit of the present invention is that it cuts down the total use of water.

Another benefit of the present invention is that the unit is constructed so that it can be made quickly and inexpensively with fairly simple molds. This arises out of the fact that most all of the parts are made all in one length, that is, the unit is actually made like a pipe.

Water recycle apparatus and methods which incorporate the structure and techniques described above and which are effective to function as described above, constitute specific objects of this invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

FIG. 1 is mostly broken away to show details of the inner construction.

DETAILED DESCRIPTION OF THE PREFERRED EMBODIMENTS

Figure 1:
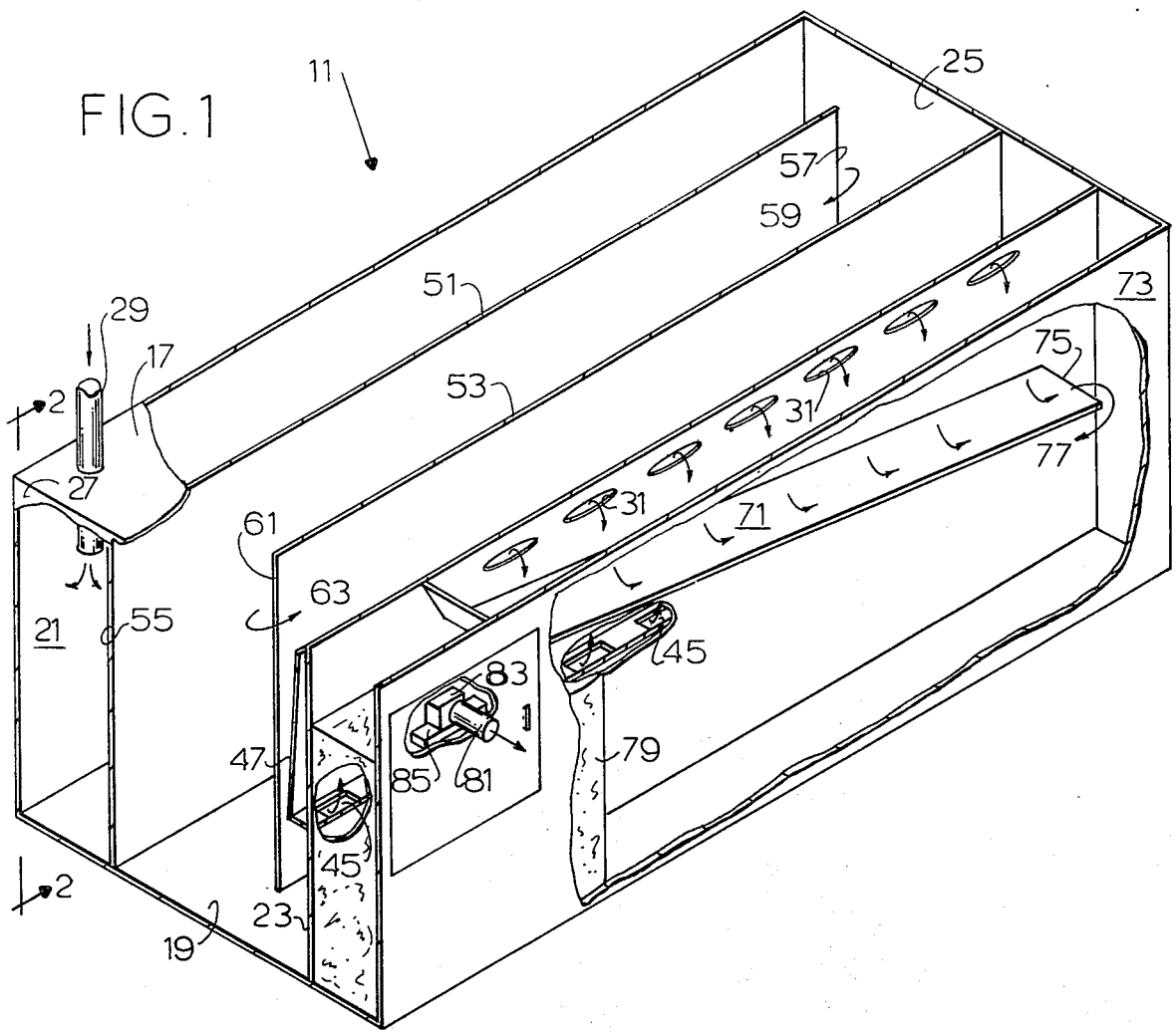
FIG. 1 is an isometric view of a water recycle unit constructed in accordance with one embodiment of the present invention.
Figure 2:
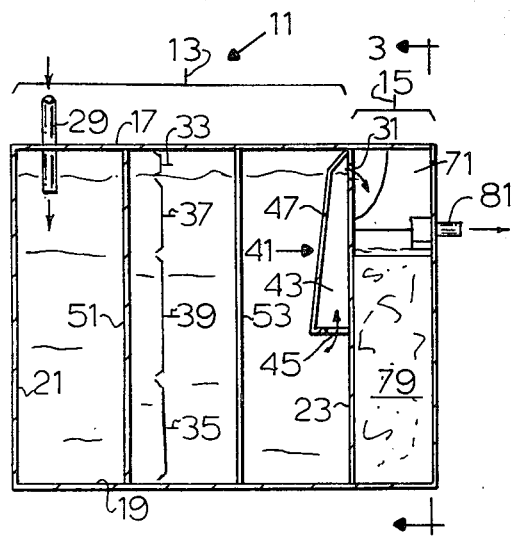
FIG. 2 is an end elevation view in cross section taken along the line and in the direction indicated by the arrows 2—2 in FIG. 1.
Figure 3:
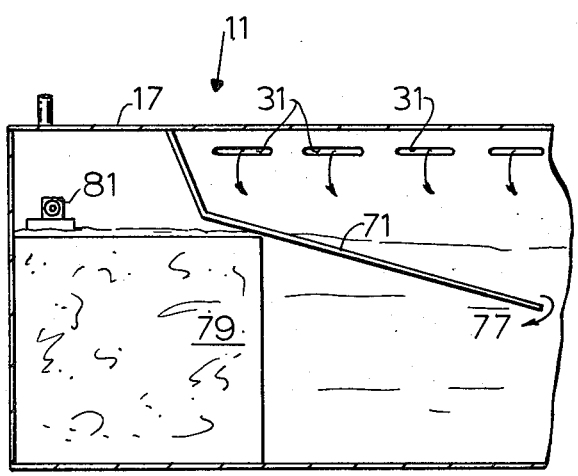
FIG. 3 is a side elevation view in cross section taken along the line and in the direction indicated by the arrows 3—3 in FIG. 2.

A water recycle unit constructed in accordance with one embodiment of the present invention is indicated generally by reference numeral 11 in FIGS. 1, 2 and 3.

The water recycle unit 11 comprises, as illustrated by the brackets in FIG. 2, a clearing container 13 and a collector - filter box 15.

The container 13 is a rectangular shaped container having a top wall 17, a bottom wall 19, a side wall 21, a side wall 23, an end wall 25 and an end wall 27.

An inlet pipe 29 for inflowing grey water extends through the top wall 17, and a number of outlet openings 31 for the outflow of cleared water extend through the side wall 23 adjacent the upper edge of the side wall 23.

As illustrated in FIG. 2, there is a small airspace 33 between the inside surface of the top wall 17 and the upper surface of the water contained within the container 17. This airspace 33 provides oxygen for bacterial action to decompose certain types of impurities, such as, grease and the like, in the grey water which is admitted through the interior of the container 13 through the inlet 29.

As also illustrated generally by the brackets in FIG. 2, the container 13 provides enough capacity for the water within the container to provide time for the water to go through all of the physical changes required to produce a zone of clear water within the container from the grey water admitted through the inlet 29. Thus, the heavy materials such as sand and dirt settle to a lower zone 35, the lighter materials, such as oil and fibers rise to an upper zone 37; and this leaves a central zone of clear water 39 between the lower zone 35 and upper zone 37.

A gate, indicated generally by the reference numeral 41, transmits clear water from the central zone 39 to the outlet openings 31 in response to the inflow of additional grey water into the container 13 through the inlet 29. The gate 41 provides an enclosed passageway 43 having an inlet 45 located within the zone 39 of clear water, and the upper end of the enclosed passageway 43 is open to the outlets 31.

The gate 41 has a side wall 47 which encloses one side of the passageway 43 and which prevents grease or other materials in the upper zone 37 from mixing with the clear water flowing upward through the passageway 43 to the outlet openings 31.

Additional grey water flowing in through the inlet 29 of the enclosed container 13 forces clear water from the zone 39 up through the passageway 43 and out the outlet openings 31.

Because the inlet 45 of the gate 41 is located within the zone 39 of the clear water, only clear water can flow out the outlet openings 31.

In a preferred embodiment of the present invention two vertical partitions 51 and 53 are constructed within the interior of the container 13.

The partition 51 extends the full highth of the interior of the container 13 and the upper and lower edges of the partition 51 are preferably joined integrally with the top wall 17 and bottom wall 19. The front edge 55 of the partition 51 is engaged with the inner surface of the end wall 21 and the back edge 57 of the partition 51 is spaced a short distance from the inner surface 25 of the end wall 25, so that the inflowing grey water through the inlet 29 must flow back along one side of the partition 51 and then around the back edge 57 and forward (as indicated by the arrow 59) along the other side of the partition and in the channel formed between the partitions 51 and 53.

The partition 53 is, like the partition 51, spaced from one end wall of the container 13; but in the case of the partition 53 the front edge 61 is spaced from the end wall 27, while the back edge of the partition 53 is joined to the end wall 25. As a consequence, the water flow within the container 13 again reverses direction (as indicated by the arrow 63) as it flows around the forward edge 61 of the partition 53.

These partitions 51 and 53 thus separate the water within the container 13 into a number of vertical flow channels, and this not only isolates and reduces the overall turbulence produced by the inflowing grey water through the inlet 29, but it also enhances the separation of the water into the three zones 35, 37 and 39 illustrated in FIG. 2.

It should be noted that the indication of the extent of the zones 35, 37 and 39 is only general and is primarily diagramatic in FIG. 2. The actual vertical extent of each zone will vary depending upon the particular makeup of the inflowing grey water. However, the clear zone will always be in the horizontal central part of the container 13 so that the inlet opening 45 will permit only clear water to flow into the gate 41.

In the specific embodiment of the water recycle unit 11 illustrated in the drawings, and in most actual installations of the water recycle unit, a filter box 15 is used in association with the clearing container 13, and in such cases the filter box 15 is preferably formed integrally with the container 13. The filter box 15 serves to collect the clear water flowing through the outlets 13 and includes an inclined spillway 71 which directs the clear water to the back (as viewed in FIG. 1) of the filter box 15.

The filter box has a side wall 23 which is shared with the container 13.

The filter box 15 also has a second side wall 73 and the end wall 25 of the container also is the end wall of the filter box while the bottom wall 19 of the container is also the bottom wall of the filter box and the top wall 17 and front end wall 27 are also common between the filter box 15 and the container 13.

The back edge 75 of the spillway 71 is spaced from the end wall 25, so that the clear water flows over the edge 75 and then forward as indicated by the arrow 77 and to a filter 79.

The clear water is then forced to flow through the filter 79 and up to an outlet 81. From the outlet 81 the water flows by gravity to one or more lower storage containers, or a pump 83 is used to pump the filtered and cleared water to one or more upper storage units. When the pump 83 is used, a float sensor 85 is preferably used so that the pump is energized only when the water level rises to a certain level with respect to the outlet 81.

In a specific embodiment of the present invention the water recycle unit 11 is molded from fiberglass.

In a specific embodiment the width of the container 13 is 18"; the width of the container and filter box 15 is 22½"; the highth of the container and filter box 15 is 18"; the length of the unit is long enough to provide a capacity of 120 gallons or more of water within the container 13; the highth of the air space 33 is about 1"; the slots 31 are about ½" in highth and 3" long; and the minimum drop between the bottom edge of the slot 31 and the upper surface of spillway 71 is 3".

Mechanical aeration throughout the container is also used in one embodiment of the invention. This mechanical aeration comprises a small air pump and plastic hoses which extend down through the top 17 and extend along the length of the container 13 at a level a few inches above the bottom panel 19. Each hose has a number of perforations that permit air to bubble up through the water in the container and to the air space 33. This embodiment also has a similar air line in the filter box 15. This mechanical aeration helps to keep the bacterial count down and assists in the clearification of the water and restores liquid oxygen.

While I have illustrated and described the preferred embodiments of our invention, it is to be understood that these are capable of variation and modification, and I, therefore, do not wish to be limited to the precise details set forth, but desire to avail ourselves of such changes and alterations as fall within the purview of the following claims.

I claim:

1. A water recycle unit for producing clear water output from grey water input, said unit comprising
    container means for containing a quantity of water within the container while heavy materials, such as sand and dirt, settle to a lower zone and while lighter materials, such as oil and fibers, rise to an upper zone, leaving a central zone of clear water between the lower and upper zones,
    input means for admitting grey water containing said materials to the interior of the container means,
    outlet means for discharging clear water from said unit, said outlet means including an outlet opening located above said central zone, and
    gate means for removing clear water from said central zone through said outlet means in response to the inflow of additional grey water into said unit through said input means, and wherein the gate means include an enclosed passageway having an inlet located within the central zone of clear water and an upper end open to said outlet opening of the outlet means and also include a sidewall which encloses one side of the passageway and which prevents grease or other materials in the upper zone from mixing with the clear water flowing upward through the passageway to the outlet opening.

2. The invention defined in claim 1 wherein the container means is an enclosed structure, except for said input means and said outlet means, having top, bottom, side and end walls and wherein said outlet opening is located near an upper edge of one side wall, so that the interior volume of the container means is substantially filled with water, except for a small air space above the water and beneath the top wall.

3. The invention defined in claim 2 wherein the container means is a rectangular shaped container so constructed that the cubic capacity can be readily increased by increasing any of the length, width or highth dimensions, without changing the principle of operation of the unit.

4. The invention defined in claim 3 including internal directing wall means for preventing turbulence resulting from inflowing grey water from mixing grey water with the clear water flowing into the inlet of the gate means.

5. The invention defined in claim 2 wherein the input means are located in the top wall of the container means.

6. The invention defined in claim 4 wherein the internal directing wall means include at least one internal partition which extends from the bottom wall to the top wall and which is connected at one end to one of the end walls and is so located with respect to the input means as to cause a reversal of the direction of flow on opposite sides of said partition and which has an edge spaced from the other end wall to permit flow between said end edge and the other end wall.

7. The invention defined in claim 6 wherein the container means and said partition are constructed of fiberglass and the partition adds both beam strength and shear strength to the rectangular shaped container to thereby permit a relatively large volume of water to be contained in a relatively light weight container structure.

8. The invention defined in claim 1 including collection means for collecting and holding clear water discharged from said outlet means.

9. The invention defined in claim 8 wherein said collection means include an enclosed container physically joined to one side wall of the container means.

10. The invention defined in claim 9 including a filter in the collection means and spillway means associated with said outlet means for collecting clear water discharged from the outlet means and for directing said clear water to and through said filter.

11. The invention defined in claim 10 including an outlet opening in said collection means located downstream of said filter for transmitting the filtered clear water to a storage unit.

12. The invention defined in claim 11 wherein said outlet in the collection means is located in an upper part of a side wall and the filtered clear water flows out of the outlet by gravity as more clear water is transmitted from said outlet means of the container means into the interior of the collection means.

13. The invention defined in claim 11 including pump and float sensor means associated with the outlet for pumping filtered, cleared water to overhead storage.

* * * * *